United States Patent
Peng

(10) Patent No.: US 9,081,794 B2
(45) Date of Patent: Jul. 14, 2015

(54) METHOD AND SYSTEM FOR AUTOMATICALLY RECOGNIZING OPERATING SYSTEM BY USB DEVICE

(75) Inventor: Yalong Peng, Guangdong (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 14/351,107

(22) PCT Filed: Feb. 23, 2012

(86) PCT No.: PCT/CN2012/071550
§ 371 (c)(1),
(2), (4) Date: Apr. 10, 2014

(87) PCT Pub. No.: WO2012/155573
PCT Pub. Date: Nov. 22, 2012

(65) Prior Publication Data
US 2014/0297901 A1    Oct. 2, 2014

(30) Foreign Application Priority Data

Oct. 18, 2011  (CN) .......................... 2011 1 0317039

(51) Int. Cl.
*G06F 11/30*    (2006.01)
*G06F 13/38*    (2006.01)

(52) U.S. Cl.
CPC ............ *G06F 11/302* (2013.01); *G06F 13/385* (2013.01)

(58) Field of Classification Search
None
See application file for complete search history.

(56) References Cited

U.S. PATENT DOCUMENTS

| | | | | |
|---|---|---|---|---|
| 2008/0005370 A1* | 1/2008 | Bolan et al. | ....................... | 710/8 |
| 2009/0248907 A1* | 10/2009 | Huang et al. | .................... | 710/10 |
| 2012/0054372 A1* | 3/2012 | Chen et al. | ..................... | 710/13 |
| 2012/0054384 A1* | 3/2012 | Zhang et al. | .................... | 710/62 |
| 2013/0042029 A1* | 2/2013 | Lu et al. | .......................... | 710/15 |

OTHER PUBLICATIONS

International Search Report for PCT/CN2012/071550 (English Translation).*

* cited by examiner

*Primary Examiner* — Idriss N Alrobaye
*Assistant Examiner* — Dayton Lewis-Taylor

(57) ABSTRACT

Disclosed are a method and system for automatically recognizing an operating system by a USB device. The method includes: determining whether an operating system string descriptor request sent by a host is received; if yes, determining that the operating system of the host is a WINDOWS operating system; if not, determining whether an operating system feature descriptor request sent by the host is received; when it is received, determining that the operating system of the host is a WINDOWS operating system; when it is not received, determining that the operating system of the host is a LINUX core operating system. The solution uses MOSD built in the WINDOWS operating system as a technical basis, so as to automatically recognize the operating system without adding any filtering drive or optical disk function, thereby reducing development costs, making the operation easy and convenient, and improving the user experience of the USB device.

12 Claims, 4 Drawing Sheets

METHOD AND SYSTEM FOR AUTOMATICALLY RECOGNIZING OPERATING SYSTEM BY USB DEVICE

TECHNICAL FIELD

The disclosure relates to the field of data communication, and particularly, to a method and system for automatically recognizing an operating system (OS) by a universal serial bus (USB) device.

BACKGROUND

With the continuous development of USB products, more and more USB devices are widely used in various operating systems. However, the demand of different operating systems on the same USB device may vary, and a USB device can perform some special functions for a particular operating system, for example, certain features in the USB device are specifically for WINDOWS operating system, and corresponding operations can only be performed in the WINDOWS operating system, and these features cannot be carried out in the LINUX core operating system. Therefore, how a USB device can automatically recognize the type of the currently accessed operating system has become a problem to be solved.

There are currently two methods for automatically recognizing an operating system. One is to pre-install a filtering drive of a USB device on a personal computer (PC) and pre-set in the drive an agreed identification code matching with the USB device. This method requires a user to pre-install a filtering drive and pre-set an identification command before using the USB device. Another method is to implement an optical disk function in the USB device, use a small computer system interface (SCSI) instruction to pre-define different switching instructions for different operating systems, and send the pre-set SCSI command to the USB device when switching the optical disk, so as to achieve the purpose of recognizing the current operating system. However, this method requires a USB device to include the optical disk function and requires a specialized operation interface for sending the SCSI instruction. Both the above two methods cause inconvenience to the user.

SUMMARY

The disclosure provides an easy-to-operate method and system for automatically recognizing an operating system by a USB device.

The disclosure provides a method for automatically recognizing an operating system by a USB device, including:

determining whether an operating system string descriptor request sent by a host is received;

if the operating system string descriptor request is received, determining that the operating system of the host is a WINDOWS operating system; and if the operating system string descriptor request is not received, determining whether an operating system feature descriptor request sent by the host is received; when the operating system feature descriptor request is received, determining that the operating system of the host is a WINDOWS operating system; and when the operating system feature descriptor request is not received, determining that the operating system of the host is a LINUX core operating system.

Preferably, the method for automatically recognizing an operating system by a USB device further includes:

when the operating system string descriptor request sent by the host is received, the USB device replying the host with a response of the operating system string descriptor request; and the host sending the operating system feature descriptor request to the USB device according to the response of the operating system string descriptor request.

Preferably, the host sending the operating system feature descriptor request to the USB device according to the response of the operating system string descriptor request includes:

the host recording in a registry the response of the operating system string descriptor request sent by the USB device;

when the USB device is connected to the host next time, determining whether the response of the operating system string descriptor request sent by the USB device exists in the registry; and if the response of the operating system string descriptor request exists in the registry, the host sending the operating system feature descriptor request to the USB device.

Preferably, the method for automatically recognizing an operating system by a USB device further includes:

when the operating system feature descriptor request sent by the host is received, the USB device replying the host with a response of the operating system feature descriptor request.

Preferably, after the USB device replies the host with the response of the operating system feature descriptor request, the method further includes:

the host acquiring functional features of the USB device and completing corresponding operations.

The disclosure also provides a system for automatically recognizing an operating system by a USB device, wherein the system includes a USB device and a host, wherein the host is configured to send an operating system string descriptor request or an operating system feature descriptor request; and the USB device includes:

a request receiving module configured to determine whether the operating system string descriptor request or the operating system feature descriptor request sent by the host is received; and an operating system recognition module configured to determine that the operating system of the host is a WINDOWS operating system when the operating system string descriptor request or the operating system feature descriptor request sent by the host is received; and determine that the operating system of the host is a LINUX core operating system when the operating system feature descriptor request sent by the host is not received.

Preferably, the USB device further includes a request responding module configured to reply the host with a response of the operating system string descriptor request when the operating system string descriptor request sent by the host is received; and the host is configured to send the operating system feature descriptor request to the USB device according to the response of the operating system string descriptor request.

Preferably, the host is further configured to:

record in a registry the response of the operating system string descriptor request sent by the USB device when the response of the operating system string descriptor request is received;

determine, when the USB device is connected to the host next time, whether the response of the operating system string descriptor request sent by the USB device exists in the registry; and if the response of the operating system string descriptor request exists in the registry, send the operating system feature descriptor request to the USB device.

Preferably, the request responding module is further configured to:

reply the host with a response of the operating system feature descriptor request when the operating system feature descriptor request sent by the host is received.

Preferably, the host is further configured to:

acquire functional features of the USB device and complete corresponding operations when the response of the operating system feature descriptor request is received.

The disclosure uses Microsoft OS descriptors (MOSD) built in the WINDOWS operating system as a technical basis, so as to automatically recognize the operating system without adding any filtering drive or optical disk function, thereby reducing the development costs, making the operation easy and convenient, and improving the user experience of the USB device.

DETAILED DESCRIPTION OF THE EMBODIMENTS

It should be understood that the particular embodiments described herein are merely used to explain the disclosure, but not to limit the disclosure.

Figure 1:
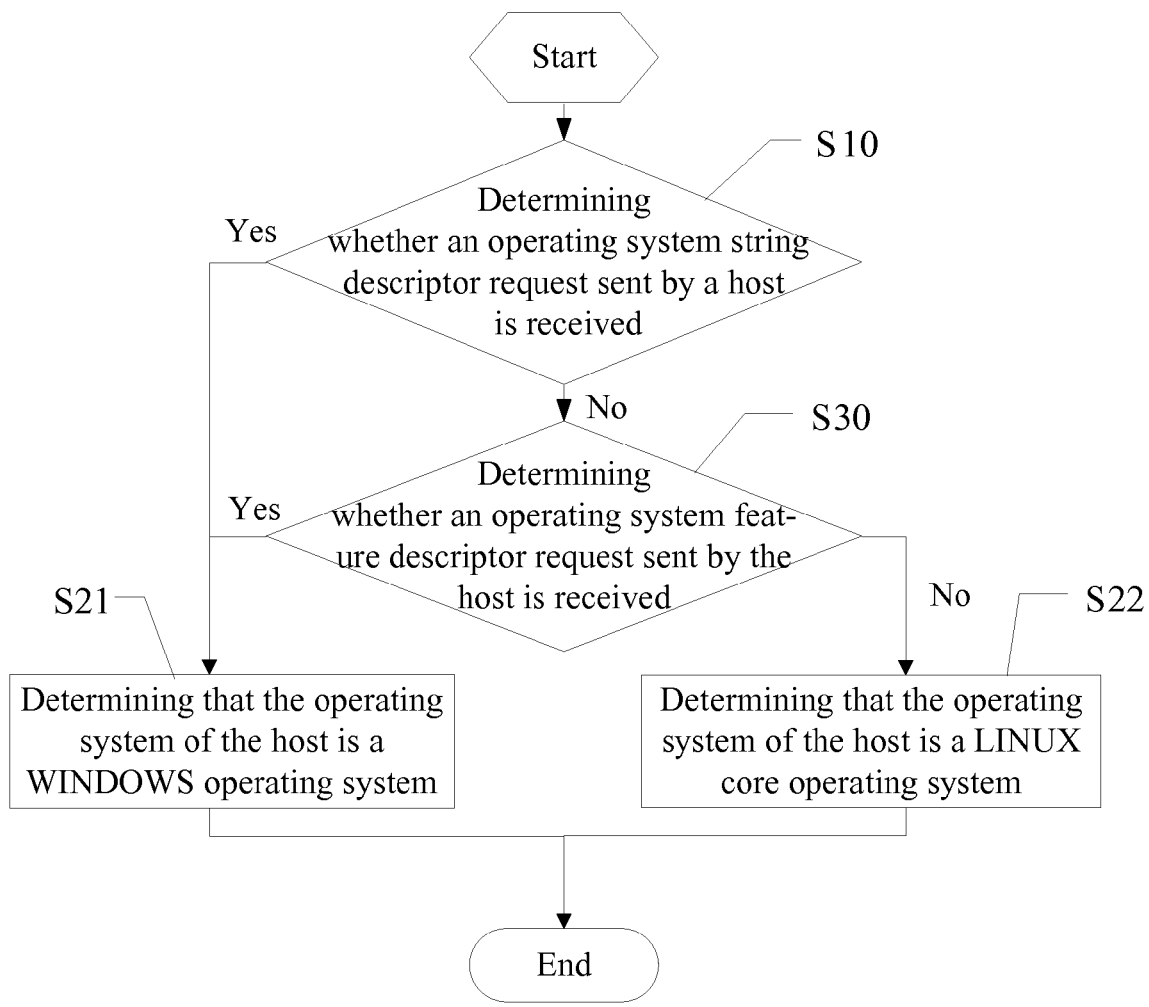
FIG. 1 is a flow chart of a method for automatically recognizing an operating system by a USB device in an embodiment of the disclosure.

As shown in FIG. 1, it is a flow chart of a method for automatically recognizing an operating system by a USB device in an embodiment of the disclosure. The method for automatically recognizing an operating system by a USB device mentioned in the embodiment includes:

step S10, it is determined whether an operating system string descriptor request sent by a host is received; if yes, step S21 is executed; and if not, step S30 is executed;

step S21, it is determined that the operating system of the host is a WINDOWS operating system;

step S30, it is determined whether an operating system feature descriptor request sent by the host is received; if yes, step S21 is executed; and if not, step S22 is executed;

step S22, it is determined that the operating system of the host is a LINUX core operating system.

In this embodiment, since the MOSD (Microsoft OS Descriptors, wherein OS means Operating System) are descriptors specific to Microsoft products, including operating system string descriptor (OS String Descriptor) and operating system feature descriptor (OS Feature Descriptor), and only WINDOWS operating system hosts will be able to send the MOSD to the connected USB device. The host is a personal computer (PC) or other devices supporting a USB main controller, such as a handheld computer, etc., and the WINDOWS operating system includes WINDOWS SP 2 and higher systems, such as WINDOWS XP SP 2, win 7, windows vista, and so on. This embodiment takes the OS String Descriptor and OS Feature Descriptor requests as the recognition instructions of the WINDOWS operating system, and when receiving the OS String Descriptor or OS Feature Descriptor request, the USB device determines that the USB device is connected to a WINDOWS operating system host. If the operating system of the host is a LINUX core operating system, the host will not send the OS String Descriptor or OS Feature Descriptor request to the USB device. This embodiment uses MOSD built in the WINDOWS operating system as a technical basis, so as to automatically recognize the operating system without adding any filtering drive or optical disk function, thereby reducing the development costs, making the operation easy and convenient, and improving the user experience of the USB device.

Figure 2:
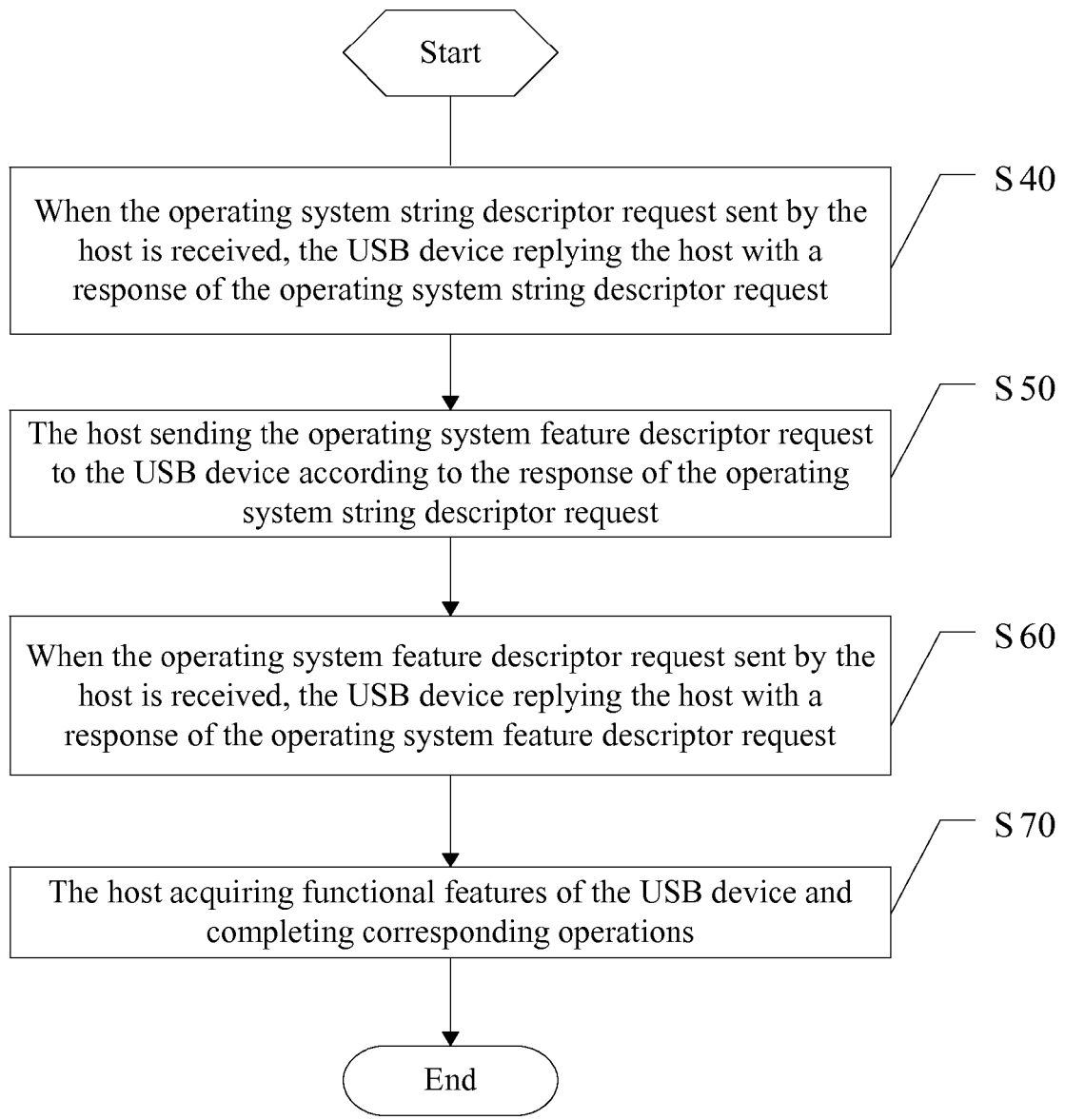
FIG. 2 is a flow chart of a method for automatically recognizing an operating system by a USB device in another embodiment of the disclosure, wherein this embodiment includes the step of responding to a request.

As shown in FIG. 2, it is a flow chart of a method for automatically recognizing an operating system by a USB device in another embodiment of the disclosure, wherein this embodiment includes the step of responding to a request.

Step S40, when an operating system string descriptor request sent by the host is received, the USB device replies the host with a response of the operating system string descriptor request; and step S50, the host sends the operating system feature descriptor request to the USB device according to the response of the operating system string descriptor request.

This embodiment aims at a host with a WINDOWS operating system, and when a USB device is connected to the host for the first time, the host with the WINDOWS operating system will send an OS String Descriptor request to the USB device, and the USB device responds to the received OS String Descriptor request, and sends the response to the host for recognition. The host determines whether the functional features in the USB device support the WINDOWS operating system by identifying whether the USB device responds to the OS String Descriptor request sent by the host, and the WINDOWS operating system will only send follow-up OS Feature Descriptor request instructions to the USB device which supports the WINDOWS operating system, so as to realize relevant functions. If the operating system of the host is a LINUX core operating system, the host will not send the OS String Descriptor request to the USB device.

Step S60, when the operating system feature descriptor request sent by the host is received, the USB device replies the host with a response of the operating system feature descriptor request.

Step S70, the host acquires functional features of the USB device and completes corresponding operations.

In this embodiment, when the host with the WINDOWS operating system receives a response of the OS Feature Descriptor request replied by the USB device, specific functional features contained in the USB device can be obtained from the USB device and related operations corresponding to each functional feature can be performed. If the USB device determines that the operating system of the host is a LINUX core operating system, the LINUX core operating system can directly perform related operations of each special function with the USB device.

Figure 3:
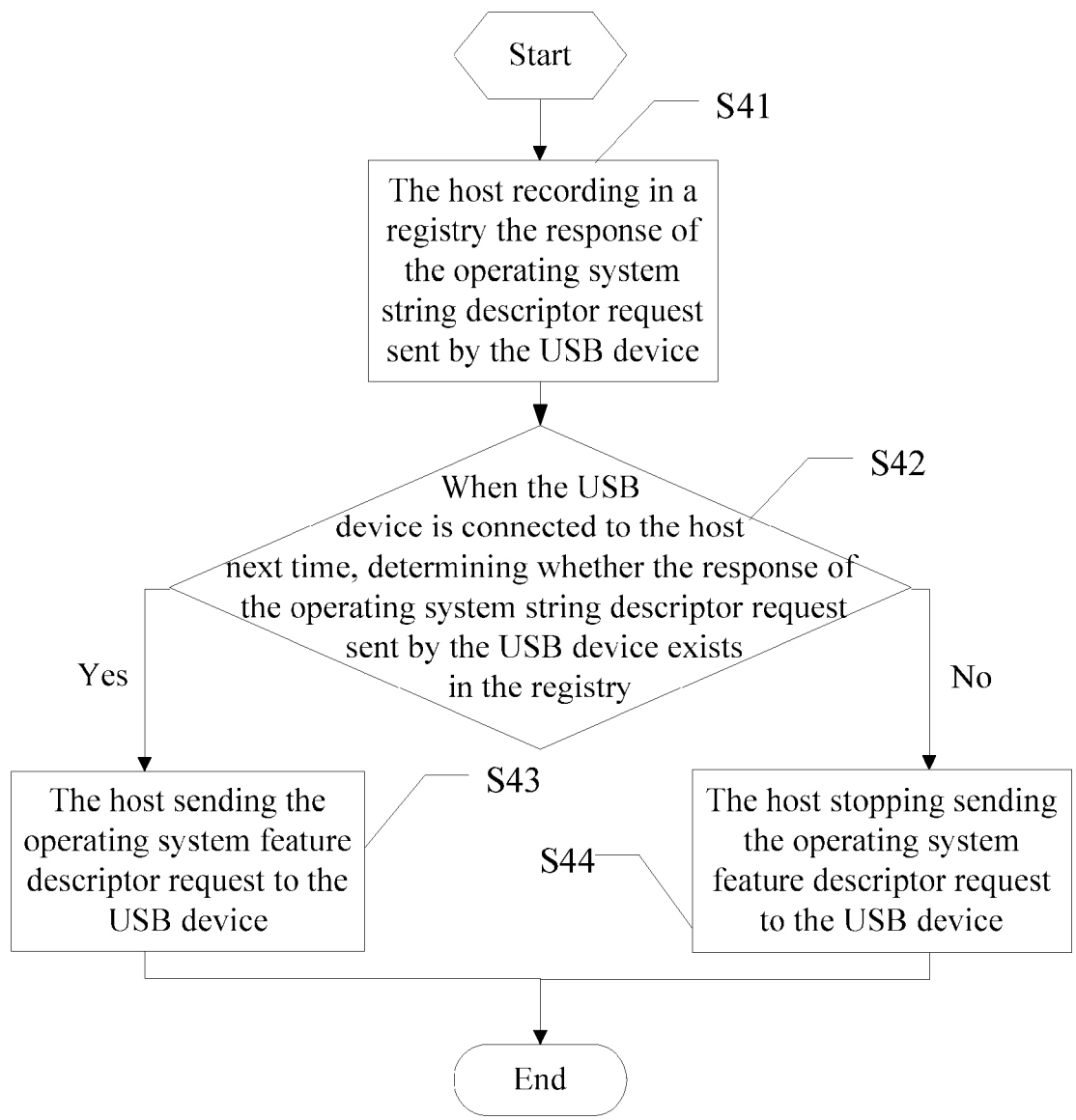
FIG. 3 is a flow chart of a method for automatically recognizing an operating system by a USB device in another embodiment of the disclosure, wherein this embodiment includes the step of handling a response of an operating system string descriptor request.

As shown in FIG. 3, it is a flow chart of a method for automatically recognizing an operating system by a USB device in another embodiment of the disclosure. The embodiment includes the step of handling a response of an operating system string descriptor request. Step S40 specifically includes:

step S41, the host records in a registry the response of the operating system string descriptor request sent by the USB device;

step S42, when the USB device is connected to the host next time, it is determined whether the response of the operating system string descriptor request sent by the USB device exists in the registry; if yes, step S43 is executed; and if not, step S44 is executed;

step S43, the host sends the operating system feature descriptor request to the USB device;

step S44, the host stops sending the operating system feature descriptor request to the USB device.

In this embodiment, the OS String Descriptor request is mainly used to determine whether the functional features in the USB device support the WINDOWS operating system, and when the USB device is connected to the WINDOWS operating system host for the first time, and replies the host with a response of the OS String Descriptor request, the host will record same in the registry, and determines that the USB device supports the WINDOWS operating system; and when the USB device is connected to the same host again later, a record will be found in the registry of the host that the USB device has replied with a response to the OS String Descriptor request, and the host directly sends an OS Feature Descriptor request to the USB device without re-sending an OS String Descriptor request to the USB device or determining whether the functional features of the USB device support the WINDOWS operating system. If the registry records that the functional features of the USB device do not support the WINDOWS operating system, when the USB device is connected to the same host later, the host will not send follow-up OS Feature Descriptor request instructions to the USB device. In this embodiment, the WINDOWS operating system host uses a registry to keep a record, and sends the OS String Descriptor request to the USB device which is connected for the first time only and receives responses replied by the USB device, and when the USB device is connected again, whether to send the OS Feature Descriptor request can be determined by just looking up the record in the registry, which saves time for subsequent acquisition of the functional features of the USB device and the completion of the corresponding operation, makes the processing speed faster, and effectively improves the work efficiency.

Figure 4:
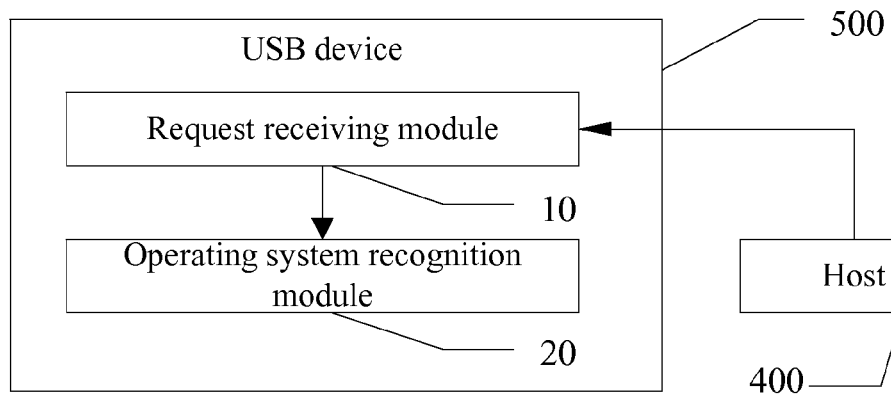
FIG. 4 is a structural schematic diagram of a system for automatically recognizing an operating system by a USB device in an embodiment of the disclosure.

As shown in FIG. 4, it is a structural schematic diagram of a system for automatically recognizing an operating system by a USB device in an embodiment of the disclosure. The system for automatically recognizing an operating system by a USB device provided in the embodiment includes:

a host 400 configured to send an operating system string descriptor request or an operating system feature descriptor request;

a USB device 500, wherein the USB device 500 specifically includes:

a request receiving module 10 configured to determine whether the operating system string descriptor request or the operating system feature descriptor request sent by the host 400 is received; and an operating system recognition module 20 configured to determine that the operating system of the host 400 is a WINDOWS operating system when the operating system string descriptor request or the operating system feature descriptor request sent by the host 400 is received; and determine that the operating system of the host is a LINUX core operating system when the operating system feature descriptor request sent by the host is not received.

In this embodiment, the host 400 is a PC or other devices supporting a USB main controller, such as a handheld computer, etc. If the operating system of the host 400 is a WINDOWS operating system, including WINDOWS SP 2 and higher systems, such as WINDOWS XP SP 2, win 7, windows vista, etc., the host 400 sends to the USB device 500 the MOSD specific to the Microsoft products, including OS String Descriptor and OS Feature Descriptor. This embodiment takes OS String Descriptor and OS Feature Descriptor requests as recognition instructions of a WINDOWS operating system, and when the request receiving module 10 deployed in the USB device 500 receives the OS String Descriptor or OS Feature Descriptor request, the operating system recognition module 20 deployed in the USB device 500 determines that the USB device 500 is connected to a host 400 with a WINDOWS operating system. If the operating system of the host 400 is a LINUX core operating system, the host 400 will not send the OS String Descriptor or OS Feature Descriptor request to the USB device, and the operating system recognition module 20 determines that the USB device 500 is connected to a host 400 with a LINUX core operating system. This embodiment uses MOSD built in the WINDOWS operating system as a technical basis, so as to automatically recognize the operating system without adding any filtering drive or optical disk function, thereby reducing the development costs, making the operation easy and convenient, and improving the user experience of the USB device.

Figure 5:
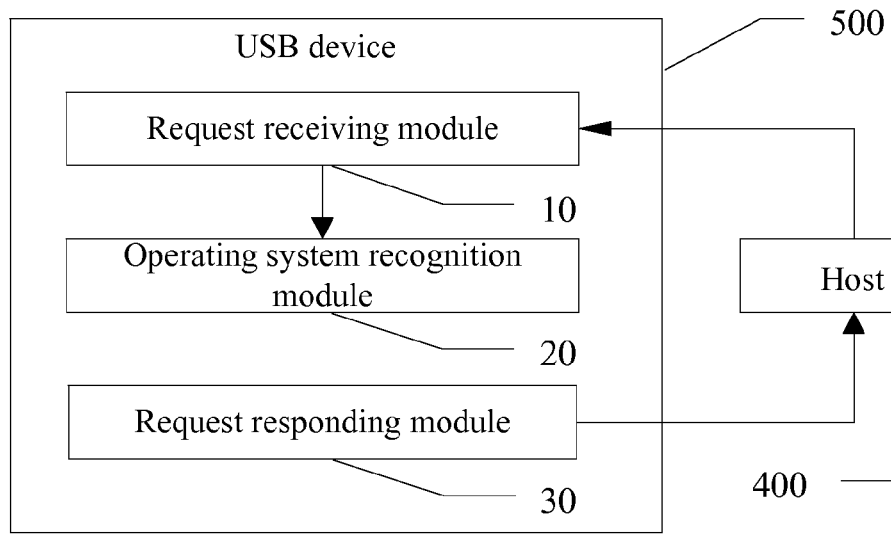
FIG. 5 is a structural schematic diagram of a system for automatically recognizing an operating system by a USB device in another embodiment of the disclosure, wherein in this embodiment the USB device further includes a request responding module.

As shown in FIG. 5, it is a structural schematic diagram of a system for automatically recognizing an operating system by a USB device in another embodiment of the disclosure. In this embodiment, the USB device 500 further includes a request responding module 30 configured to reply the host with a response of the operating system string descriptor request when the operating system string descriptor request sent by the host is received;

the host 400 is specifically configured to send the operating system feature descriptor request to the USB device 500 according to the response of the operating system string descriptor request.

In this embodiment, when the USB device 500 is connected to the host 400 for the first time, if the operating system of the host 400 is a WINDOWS operating system, it is needed to determine whether the functional features contained in the USB device 500 support the WINDOWS operating system, that is, whether the one or more feature descriptions have functions dedicated to the WINDOWS operating system. In this embodiment, whether the functional features in the USB device 500 support the WINDOWS operating system is determined by identifying whether the request responding module 30 deployed in the USB device 500 responds to the OS String Descriptor request sent by the host 400, and the WINDOWS operating system will send the OS Feature Descriptor request to the USB device 500 only when the USB device 500 supports the WINDOWS operating system, in order to realize relevant functions. If the operating system of the host 400 is a LINUX core operating system, the host 400 will not send the OS String Descriptor request to the USB device 500.

In the embodiments of the disclosure, the request responding module 30 is further configured to:

reply the host 400 with a response of the operating system feature descriptor request when the operating system feature descriptor request sent by the host 400 is received.

In this embodiment, when the request receiving module 10 receives the OS Feature Descriptor request sent by the host 400, the request responding module 30 deployed in the USB device 500 also responds to the OS Feature Descriptor request, and prompts the host 400 that functional features can be extracted. If the operating system of the host 400 is a LINUX core operating system, the host 400 can directly perform relevant operations according to the functional features for the LINUX core operating system contained in the USB device 500 without waiting for the request responding module 30 to reply with an OS Feature Descriptor response.

In the embodiments of the disclosure, the host 400 is further configured to:

record in a registry the response of the operating system string descriptor request sent by the USB device 500 when the response of the operating system string descriptor request is received;

determine whether the response of the operating system string descriptor request sent by the USB device 500 exists in the registry when the USB device 500 is connected to the host 400 next time; and if yes, send the operating system feature descriptor request to the USB device 500;

if not, stop sending the operating system feature descriptor request to the USB device 500.

In this embodiment, the request responding module 30 deployed in the USB device 500 will make the right response to the OS String Descriptor request only when the functional features contained in the USB device 500 support the WINDOWS operating system. For the USB device 500 which is connected to the host 400 with the WINDOWS operating system for the first time, after the USB device 500 replies the host with a response to the OS String Descriptor request, the host 400 will record the response of the USB device 500 in the registry; and when the USB device 500 is connected to the same host 400 again later, the record will be found in the registry of this host 400 that the USB device 500 has replied with a response to the OS String Descriptor request, and the host 400 directly sends the OS Feature Descriptor request to the USB device 500 without re-sending the OS String Descriptor request to determine whether the functional features of the USB device 500 support the WINDOWS operating system. Otherwise, when the USB device 500 is connected to the same host 400 later, the host 400 will not send the OS Feature Descriptor request recognition instruction to the USB device 500. The above-mentioned embodiments only determine the USB device 500 which is connected to the host 400 for the first time, identify whether the functional features thereof support the WINDOWS operating system, and record the determination result, which can provide a reference for the next connection of the USB device 500 to the same host 400. The host 400 will select whether to send the OS Feature Descriptor request according to the record, which reduces the processing flow of the recognition process of the operating system, and improves the processing efficiency.

In the embodiments of the disclosure, the host 400 is also configured to acquire functional features of the USB device 500 and complete corresponding operations when the response of the operating system feature descriptor request is received.

In this embodiment, when the WINDOWS operating system host 400 receives a response to the OS Feature Descriptor request replied by the USB device 500, the host 400 can obtain specific functional features from the USB device 500 and perform corresponding operations according to the functional features. If the USB device 500 determines that the operating system of the host 400 is a LINUX core operating system, the LINUX core operating system can directly perform related operations of each special function with the USB device 500.

The descriptions above are only the preferable embodiment of the disclosure, which are not used to restrict the disclosure. Any equivalent replacements of the structure or the flow based on the contents of the specification and drawings of the disclosure, or direct or indirect application of the equivalent replacements in other related technical fields shall fall within the scope of protection of the disclosure.

Industrial Applicability

The disclosure uses MOSD built in the WINDOWS operating system as a technical basis, so as to automatically recognize the operating system without adding any filtering drive or optical disk function, thereby reducing the development costs, making the operation easy and convenient, and improving the user experience of the USB device.

What is claimed is:

1. A method for automatically recognizing an operating system by a universal serial bus (USB) device, comprising:

determining whether an operating system string descriptor request sent by a host is received;

if the operating system string descriptor request is received, determining that the operating system of the host is a WINDOWS operating system, wherein the USB device replies to the host with a response of the operating system string descriptor request, and the host sends the operating system feature descriptor request to the USB device according to the response of the operating system string descriptor request; and if the operating system string descriptor request is not received, determining whether an operating system feature descriptor request sent by the host is received; when the operating system feature descriptor request is received, determining that the operating system of the host is a WINDOWS operating system; and when the operating system feature descriptor request is not received, determining that the operating system of the host is a LINUX core operating system.

2. The method for automatically recognizing an operating system by a USB device as claimed in claim 1, wherein the host sending the operating system feature descriptor request to the USB device according to the response of the operating system string descriptor request comprises:

the host recording in a registry the response of the operating system string descriptor request sent by the USB device;

when the USB device is connected to the host next time, determining whether the response of the operating system string descriptor request sent by the USB device exists in the registry; and if the response of the operating system string descriptor request exists in the registry, the host sending the operating system feature descriptor request to the USB device.

3. The method for automatically recognizing an operating system by a USB device as claimed in claim 2, further comprising:

when the operating system feature descriptor request sent by the host is received, the USB device replying the host with a response of the operating system feature descriptor request.

4. The method for automatically recognizing an operating system by a USB device as claimed in claim 3, wherein after the USB device replies the host with the response of the operating system feature descriptor request, the method further comprises:

the host acquiring functional features of the USB device and completing corresponding operations.

5. The method for automatically recognizing an operating system by a USB device as claimed in claim 1, further comprising:
when the operating system feature descriptor request sent by the host is received, the USB device replying the host with a response of the operating system feature descriptor request.

6. The method for automatically recognizing an operating system by a USB device as claimed in claim 5, wherein after the USB device replies the host with the response of the operating system feature descriptor request, the method further comprises:
the host acquiring functional features of the USB device and completing corresponding operations.

7. A system for automatically recognizing an operating system by a USB device, comprising a USB device and a host, wherein the host is configured to send an operating system string descriptor request or an operating system feature descriptor request; and the USB device comprises:
a request receiving module configured to determine whether the operating system string descriptor request or the operating system feature descriptor request sent by the host is received; and
an operating system recognition module configured to determine that the operating system of the host is a WINDOWS operating system when the operating system string descriptor request or the operating system feature descriptor request sent by the host is received; and determine that the operating system of the host is a LINUX core operating system when the operating system feature descriptor request sent by the host is not received;
wherein the USB device further comprises a request responding module configured to reply the host with a response of the operating system string descriptor request when the operating system string descriptor request sent by the host is received; and the host is configured to send the operating system feature descriptor request to the USB device according to the response of the operating system string descriptor request.

8. The system for automatically recognizing an operating system by a USB device as claimed in claim 7, wherein the host is further configured to:
record in a registry the response of the operating system string descriptor request sent by the USB device when the response of the operating system string descriptor request is received;
determine, when the USB device is connected to the host next time, whether the response of the operating system string descriptor request sent by the USB device exists in the registry; and
if the response of the operating system string descriptor request exists in the registry, send the operating system feature descriptor request to the USB device.

9. The system for automatically recognizing an operating system by a USB device as claimed in claim 8, wherein the request responding module is further configured to:
reply the host with a response of the operating system feature descriptor request when the operating system feature descriptor request sent by the host is received.

10. The system for automatically recognizing an operating system by a USB device as claimed in claim 9, wherein the host is further configured to:
acquire functional features of the USB device and complete corresponding operations when the response of the operating system feature descriptor request is received.

11. The system for automatically recognizing an operating system by a USB device as claimed in claim 7, wherein the request responding module is further configured to:
reply the host with a response of the operating system feature descriptor request when the operating system feature descriptor request sent by the host is received.

12. The system for automatically recognizing an operating system by a USB device as claimed in claim 11, wherein the host is further configured to:
acquire functional features of the USB device and complete corresponding operations when the response of the operating system feature descriptor request is received.

* * * * *